United States Patent
Hyun et al.

(10) Patent No.: US 7,548,564 B2
(45) Date of Patent: Jun. 16, 2009

(54) METHOD AND APPARATUS FOR TRANSMITTING DATA BASED ON OFDM

(75) Inventors: Seok Bong Hyun, Daejeon (KR); Byung Jo Kim, Daejeon (KR); Seong Su Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 602 days.

(21) Appl. No.: 11/299,184

(22) Filed: Dec. 9, 2005

(65) Prior Publication Data

US 2006/0126492 A1 Jun. 15, 2006

(30) Foreign Application Priority Data

Dec. 10, 2004 (KR) ............... 10-2004-0104296
May 11, 2005 (KR) ............... 10-2005-0039173

(51) Int. Cl.
*H04J 1/00* (2006.01)
(52) U.S. Cl. .................. 370/480; 370/208; 370/476
(58) Field of Classification Search ........... 370/476, 370/206, 208, 474, 480
See application file for complete search history.

(56) References Cited

U.S. PATENT DOCUMENTS

| | | | |
|---|---|---|---|
| 5,677,927 A | 10/1997 | Fullerton et al. | |
| 6,609,209 B1 | 8/2003 | Tiwari et al. | |
| 6,700,865 B1 * | 3/2004 | Yamamoto et al. | 370/208 |
| 6,757,344 B2 * | 6/2004 | Carleton | 375/341 |
| 7,075,949 B2 * | 7/2006 | Okada et al. | 370/510 |
| 7,158,473 B2 * | 1/2007 | Kurobe et al. | 370/204 |
| 7,161,985 B2 * | 1/2007 | Dostert et al. | 375/257 |
| 7,492,791 B2 * | 2/2009 | Geile et al. | 370/480 |
| 2004/0059825 A1 * | 3/2004 | Edwards et al. | 709/230 |
| 2004/0151109 A1 | 8/2004 | Batra et al. | |
| 2004/0233841 A1 * | 11/2004 | Sanada et al. | 370/210 |
| 2005/0157715 A1 * | 7/2005 | Hiddink et al. | 370/389 |
| 2007/0189150 A1 * | 8/2007 | Kasami | 370/208 |

OTHER PUBLICATIONS

"Design of a Multiband OFDM System for Realistic UWB Channel Environments", A. Batra, et al., IEEE Transactions on Microwave Theory and Techniques, vol. 52, No. 9, Sep. 2004, pp. 2123-2138.

* cited by examiner

*Primary Examiner*—Chi H. Pham
*Assistant Examiner*—Kevin Mew
(74) *Attorney, Agent, or Firm*—Blakely, Sokoloff, Taylor & Zafman LLP

(57) ABSTRACT

Provided is a method and apparatus for transmitting data based on OFDM (Orthogonal Frequency Division Multiplexing). The method includes: forming a plurality of packets suitable for a selected transmission mode from data input to a transmitter; determining a transfer rate of the data; when the data transfer rate is determined to be low and synchronous connection oriented link should be maintained, dividing each of the plurality of packets into a plurality of sub-packets; and transmitting the divided sub-packets, wherein when the divided sub-packets are transmitted, a power supply duration of the transmitter is reduced by using a DPM (dynamic power management) or fine state control unit.

7 Claims, 5 Drawing Sheets

METHOD AND APPARATUS FOR TRANSMITTING DATA BASED ON OFDM

CROSS-REFERENCE TO RELATED APPLICATION

This application claims the priority of Korean Patent Application No. 2004-104296, filed Dec. 10, 2004, No. 2005-39173, filed May 11, 2005, the disclosure of which is incorporated herein in its entirety by reference.

BACKGROUND

1. Field of the Invention

The present invention relates to a method and apparatus for transmitting data based on Orthogonal Frequency Division Multiplexing (OFDM), for reducing power consumption.

2. Discussion of Related Art

Next-generation very high-speed wireless communication systems are under development for the purpose of realizing high-speed data transmission of more than 1 Gb/s in a local area. Currently influential local area very high-speed wireless communication network technology includes a next-generation Wireless Local Area Network (WLAN), which is under research as a standard of IEEE 802.11n, and a high-speed Wireless Personal Area Network (WPAN), which is under development as a standard of IEEE 802.15.3a. The next-generation WLAN guarantees an actual throughput of more than 100 Mb/s in a Media Access Control (MAC) layer.

The next-generation WLAN basically uses Orthogonal Frequency Division Multiplexing (OFDM) in a physical layer so as to maintain backward compatibility with a conventional WLAN based on an IEEE 802.11a/g standard. The OFDM has good spectrum efficiency due to mutual orthogonality and superposition of spectrums of a sub-channel.

The high-speed WPAN uses a signal transmission physical layer, such as ultra-wideband OFDM using a base-bandwidth of 528 MHz and Direct Sequence-Ultra WideBand (DS-UWB), which are influential international standard technologies. In the Direct Sequence-Ultra WideBand (DS-UWB), transmission data is multiplied by a spread code, and a bandwidth signal is converted to have an ultra wide bandwidth of more than 3 GHz in a Direct-Sequence Spread Spectrum (DSSS).

Detailed descriptions of the above methods are made with reference to data of a working group for IEEE 802.15.3a standardization.

FIG. 1 is a block diagram illustrating a conventional transceiving system based on OFDM.

Referring to FIG. 1, an OFDM transmitter 100 includes an OFDM modulator 100a for forming and OFDM-modulating a packet from a payload data signal input through an upper application layer and a MAC layer; and an analog/RF unit 100b for converting a digital signal into an analog signal through digital-to-analog modulation, and transmitting an electronic wave signal through an RF terminal and an antenna.

In detail, the OFDM modulator 100a includes a scrambler 102 for transforming input data; encoders 104 for encoding the input data; interleavers 106 for reducing error between neighboring bits; a mapper 108 for transforming bit stream data into complex number data on an I-Q constellation; a pilot insert unit 110 for adding a pilot signal necessary for channel estimation of an OFDM receiving terminal; an Inverse Fast Fourier Transform (IFFT) unit 112 for transforming a frequency domain signal into a time domain signal by fourier transform; and a guard interval and cyclic prefix insert unit 114 for adding an appropriate Guard Interval (GI) and Cyclic Prefix (CP) signal for corresponding to multi-path fading.

The analog/RF unit 100b includes a wave shaping unit 116 for mixing a preamble signal with an OFDM symbol signal and selectively filtering the mixed signal to reduce a spurious signal; a Digital-to-Analog Converter (DAC) 118 for converting the digital signal into the analog signal; a BaseBand Analog (BBA) unit 120 for filtering and amplifying the analog signal; an RF up-conversion mixer array 122 for converting the amplified signal into an RF signal; an amplifier 124; an antenna 126; and a frequency synthesizer 128 for generating a frequency signal.

An OFDM receiver 130 includes an RF/digital unit 130a for amplifying an electronic wave signal received through an antenna 132 and converting the amplified signal into a digital signal; and an OFDM demodulator 130b for OFDM demodulating data. In detail, the RF/digital unit 130a includes an amplifier 134 for amplifying the signal received through the antenna 132; an RF down-conversion mixer array 136 for converting the amplified signal into a base-band signal; a low pass filter 138 for filtering the base-band analog signal; an Analog-to-Digital Converter (ADC) 140 for converting the analog signal into the digital signal; an Automatic Gain Control (AGC) unit 142 for controlling a gain of a receiving terminal to be suitable for digital signal processing such as frame synchronization, symbol synchronization, and the like; and a synchronizer 144 for performing the signal processing.

The OFDM demodulator 130b includes a guard interval and cyclic prefix eliminator 146 for eliminating a Guard Interval (GI) and Cyclic Prefix (CP) signal; a Fast Fourier Transform (FFT) unit 148 for transforming a time domain signal into a frequency domain signal; an equalizer 150 for amplifying or inserting a signal that is distorted through amplification or transmission into a transmission line for correction and collecting and normalizing a characteristic of the signal by fourier transform; a carrier phase and time tracer 152 connected to the FFT unit 148 and the equalizer 150 and tracing a phase and a time of a carrier; a demapper 154 for again transforming complex number data into bit stream data; a deinterleaver 156; a decoder 158 for decoding data; and a descrambler 160 for descrambling data.

However, in the case where a very high-speed wireless communication base-band modem chip having a data transfer rate of 1 Gb/s is realized using a conventional OFDM transceiver, there is a drawback in that a clock speed for driving a digital chip, a sampling clock speed of the digital-to-analog converter 118 and the analog-to-digital converter 140, and a bandwidth of the RF amplifiers 124 and 134 are increased, thereby increasing power consumption.

Accordingly, in the case where transmission is performed at a low data transfer rate of 1 Mb/s, using the very high-speed wireless communication base-band modem chip having a data transfer rate of 1 Gb/s, without any consideration of power consumption, an excessive amount of power is consumed. For example, when a low-rate audio signal is transmitted using a chip manufactured using wideband OFDM suitable for a data transfer rate of 1 Gb/s, much more power is consumed compared to a chip optimized for low throughput, such as a Bluetooth chip. In other words, management of power consumption based on the data transfer rate, which has not yet been seriously considered in a conventional wireless communication system having a data transfer rate of less than 100 Mb/s, becomes more important due to an increased data transfer rate of more than 1 Gb/s and increased power consumption.

At present, technology for reducing power consumption includes a method of using a standby mode and/or a sleep mode for deactivating a chip and placing it in an idle state where data is not transmitted so that only minimal power is consumed, and a clock gating and DVFS (Dynamic Voltage Frequency Scaling) method for lowering a clock speed of a processor chip (U.S. Pat. No. 6,609,209).

However, the former method has a drawback in that it takes considerable time to convert an entire transmission system from an active state to a sleep or standby state, and vice versa.

Further, the former method has another drawback in that like a voice/audio signal, a low data transfer rate is required, but it is difficult to apply to Synchronous Connection Oriented (SCO) or streaming systems which are maintained in an active state for the duration of a call or audio reproduction.

The clock gating method is suitable for a computer or a digital processor, but has a drawback in that it is difficult to apply to a wireless transmission system including a plurality of analog/RF circuits that operate independent of a clock signal.

In a communication system, unlike a computer, clock and timing information is very important and is designed in a chip development stage by selecting clocks optimized to a standard of communication. Therefore, in order to vary a clock signal, it is not only necessary to change the entire structure of the communication system, but the standard must be changed as well. Accordingly, broadband low power consumption technology is required to efficiently transmit low-speed streaming data in a broadband transmission system for performing very high-speed wireless communication with a data transfer rate of 1 Gb/s.

SUMMARY OF THE INVENTION

The present invention is directed to a method and apparatus for transmitting data based on Orthogonal Frequency Division Multiplexing (OFDM) that facilitate high-speed wireless transmission of 1 Gb/s in a local area as well as control of an duration of operation of each part of a circuit based on an amount of transmission data, thereby reducing power consumption of a communication system and a System-on-Chip (SoC). Here, one example of the above-mentioned control is reducing the duration of operation in an application field having a low data rate such as voice/audio transmission.

One aspect of the present invention provides a method for transmitting data based on OFDM (Orthogonal Frequency Division Multiplexing), the method including: forming a plurality of packets suitable for a selected transmission mode from data input to a transmitter; determining a transfer rate of the data; if the data transfer rate is determined to be low, dividing each of the plurality of packets into a plurality of sub-packets; and transmitting the divided sub-packets, wherein when the divided sub-packets are transmitted, a power supply duration of the transmitter is reduced.

Another aspect of the present invention provides an apparatus for transmitting data based on Orthogonal Frequency Division Multiplexing (OFDM), the apparatus including: a packet configuration unit for forming a plurality of packets suitable for a selected transmission mode from payload data generated in an upper application layer and a MAC (Media Access Control) layer and storing the plurality of packets therein; a packet divider for, if it is determined that a transfer rate of the stored packet is low, dividing each of the plurality of packets into a plurality of sub-packets; a modulating unit for OFDM-modulating the payload data of the packet or the sub-packet; an analog/RF unit for converting the modulated signal into an analog signal and RF-transmitting the converted analog signal; and a fine state controlling unit for, when the sub-packet is transmitted, reducing a power supply duration of the modulating unit and the analog/RF unit.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, exemplary embodiments of the present invention will be described in detail. However, the present invention is not limited to the embodiments disclosed below and can be implemented in various modified forms. The following exemplary embodiments are described to make this disclosure complete and enable those of ordinary skill in the art to fully understand the present invention.

Figure 2:
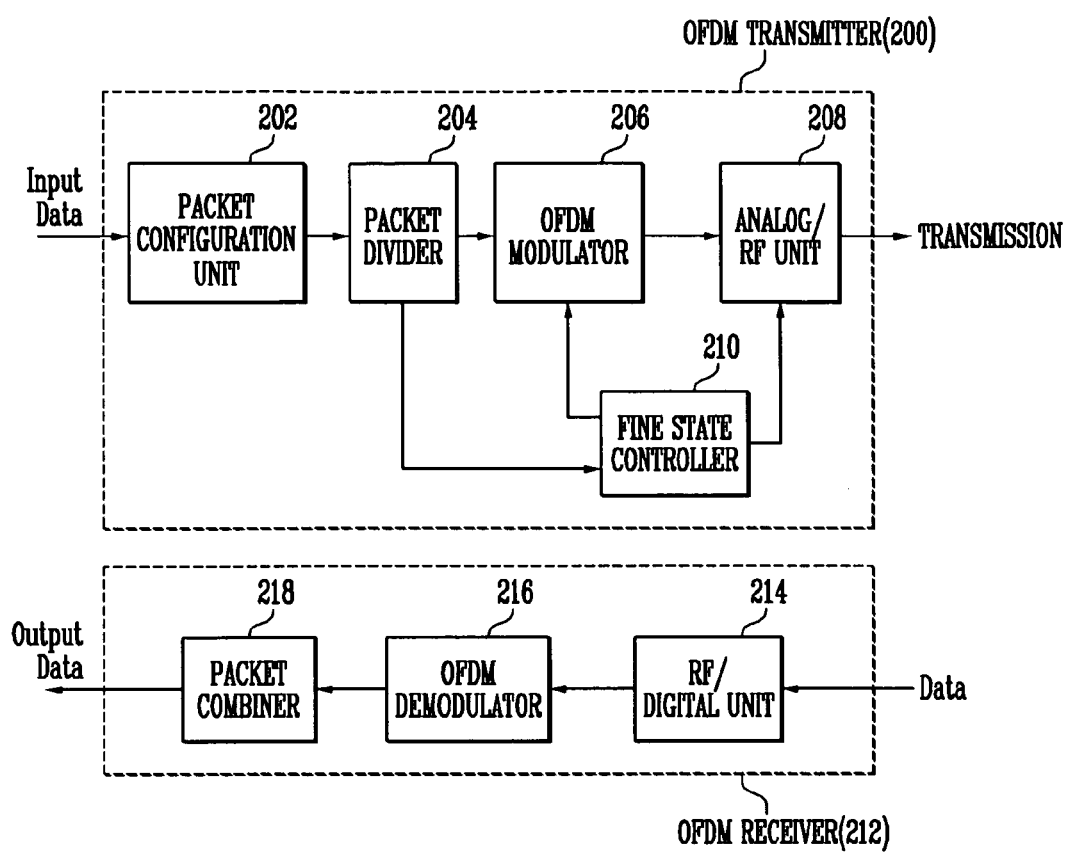
FIG. 2 is a block diagram illustrating a construction of a transceiving system according to an exemplary embodiment of the present invention.

FIG. 2 is a block diagram illustrating a construction of a transceiving system according to an embodiment of the present invention.

Referring to FIG. 2, the transceiving system includes an OFDM transmitter 200 and an OFDM receiver 212.

The OFDM transmitter 200 includes a packet configuration unit 202, a packet division unit 204, an OFDM modulator 206, an analog/RF unit 208, and a fine state controller 210.

The packet configuration unit 202 is a part of a PHYsical layer Service Access Point (PHY-SAP) connecting a physical layer with an upper layer. In one embodiment, depending on a control parameter, the packet configuration unit 202 adds a header, a Header Check Sequence (HCS), tail bits, a Frame Check Sequence (FCS), and pad bits, before and after payload data in a Media Access Control (MAC) layer which is the upper layer, and forms and stores a packet. In another embodiment, the packet configuration unit 202 can also collect payload data and form a larger packet.

The packet division unit 204 determines a transfer rate of the packet to be transmitted. If the transfer rate is determined to be low, the packet division unit 204 divides the formed packet into smaller sub-packets. In one embodiment, when the transfer rate is less than 10 Mb/s, it is determined to be the low transfer rate mode.

The OFDM modulator 206 modulates the payload data of the packet. In detail, the OFDM modulator 206 includes a scrambler for transforming a payload data portion of the packet; a Forward Error Correction (FEC) encoder for performing convolutional coding, turbo coding, or Low Density Parity Check (LDPC) coding; an interleaver for reducing error between neighboring bits; an N-Quadrature Amplitude Modulation (QAM) mapper for transforming bit stream data into complex number data on an I-Q constellation; a pilot insert unit for adding a pilot signal necessary for channel estimation of an OFDM receiving terminal; an Inverse Fast Fourier Transform (IFFT) unit for transforming a frequency domain signal into a time domain signal; a guard interval and cyclic prefix insert unit for adding an appropriate Guard Interval (GI) and Cyclic Prefix (CP) signal for corresponding to multi-path fading; a preamble generator for generating a signal necessary for performing a kernel signal process at a receiving terminal, such as frame synchronization, symbol synchronization, channel estimation, and offset compensation; and a wave shaping unit for mixing a preamble signal with an OFDM symbol signal and selectively filtering the mixed signal to reduce a spurious signal.

The analog/RF unit 208 converts a digital signal into an analog signal through digital-to-analog modulation, and then transmits an electronic wave signal through an RF terminal and an antenna. In detail, the analog/RF unit 208 includes a Digital-to-Analog Converter (DAC) for converting the digital signal into the analog signal; a BaseBand Analog (BBA) unit for filtering and amplifying the baseband analog signal; an RF up-conversion mixer array for converting the baseband signal into an RF signal; an RF wideband amplifier; a wideband antenna; and a multi-frequency synthesizer for generating a wideband frequency signal of a plurality of tones.

An object of the present invention is to manufacture a semiconductor chip, by integrating all main elements of the analog/RF unit 208, except the wideband antenna, into a single chip. In other words, since each of the elements is constructed as a low-voltage Complementary Metal Oxide Semiconductor (CMOS) or a SiGe element, it is appropriate that the elements are integrated into the single chip using high-integration semiconductor technology.

The fine state controller or Dynamic Power Management (DPM) unit 210 controls an active or wake-up state of each constituent element of the OFDM modulator 206 and the analog/RF unit 208 depending on the data transfer rate, and in particular, reduces a power supply duration when the data transfer rate is low.

Meantime, the OFDM receiver 212 includes an RF/digital unit 214 for amplifying an electronic wave signal received through an antenna and converting the amplified signal into a digital signal; an OFDM demodulator 216 for demodulating a data packet through OFDM demodulation; and a packet combiner 218. The fine state controller 210 also controls an active state of each constituent element of the OFDM receiver 212.

Figure 1:
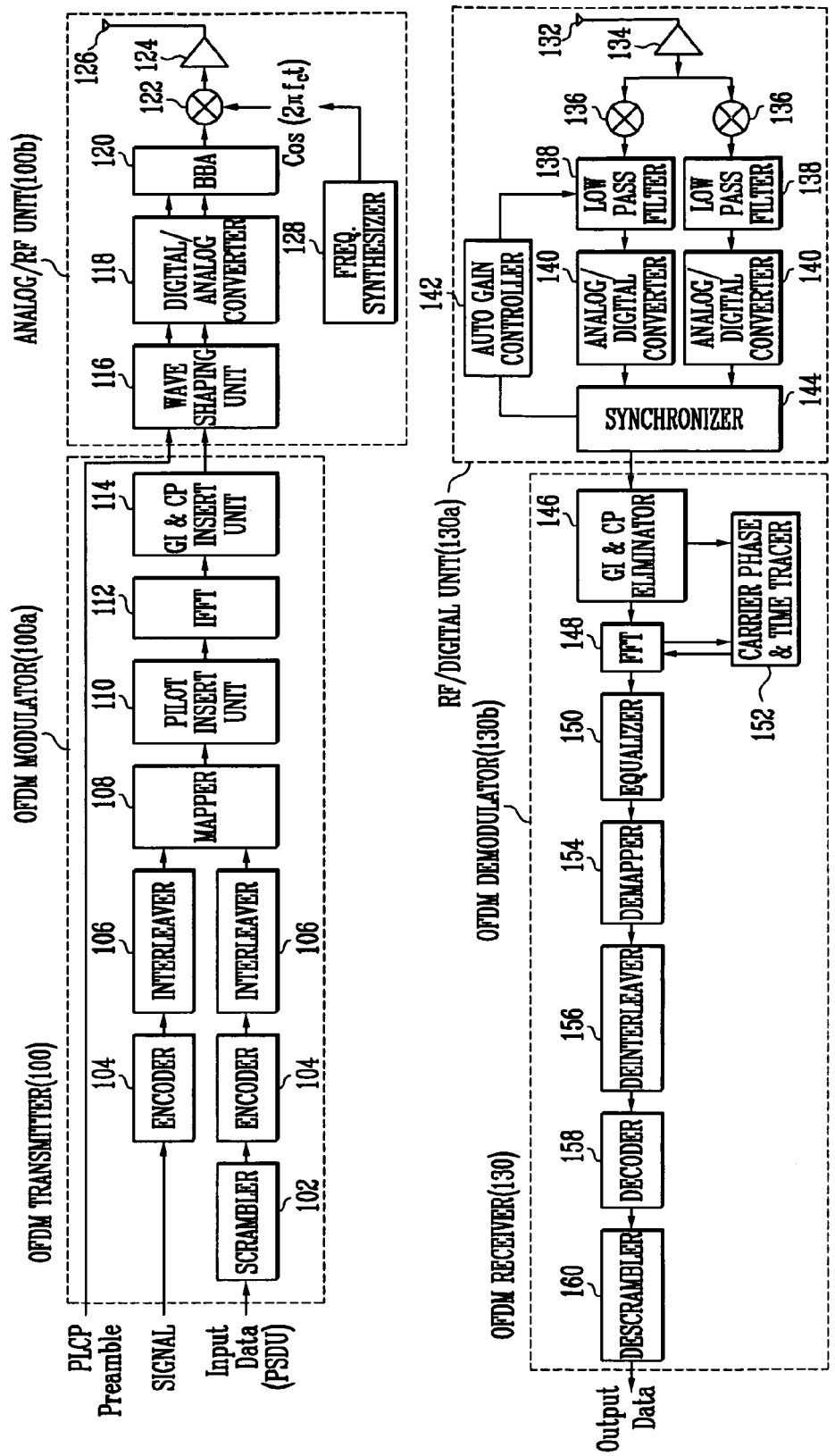
FIG. 1 is a block diagram illustrating a conventional transceiving system used in Orthogonal Frequency Division Multiplexing (OFDM)

The RF/digital unit 214 and the OFDM demodulator 216 respectively correspond to an RF/digital unit 130a and an OFDM demodulator 130b of a conventional transceiving system shown in FIG. 1. Their functions and structures, as shown in FIG. 1, are known in the art and therefore will not be described.

When the demodulated data packets are sub packets, the packet combiner 218 combines the data packets to form packets suitable for a selected transmission mode.

Figure 3A:
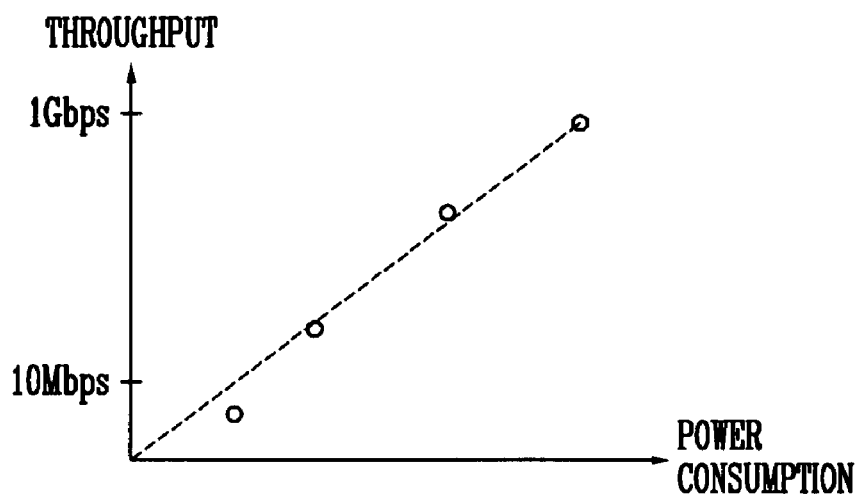
FIG. 3 is a graph illustrating the relationship between a data transfer rate and average power consumption in the inventive transceiving system and a conventional transceiving system.
Figure 3B:
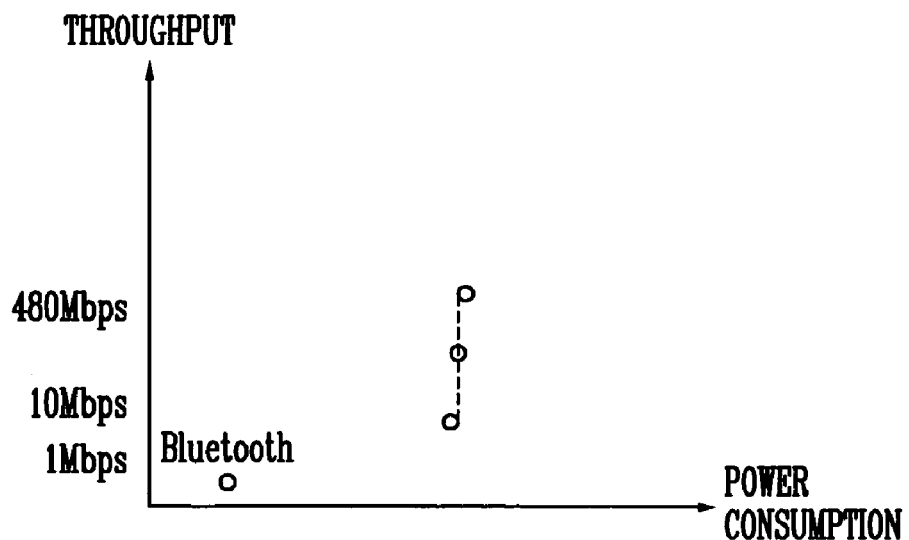

FIGS. 3A and 3B are graphs illustrating the relationship between data transfer rate and average power consumption in the inventive transceiving system and the conventional transceiving system, respectively.

As shown in FIG. 3A, in the inventive transceiving system, the data transfer rate and average power consumption are directly proportional to one another.

Referring to FIG. 3B, in the conventional transceiving system, it can be seen that power consumption is almost constant irrespective of the data transfer rate.

In other words, in the conventional OFDM-based wideband transceiving system of FIG. 1, a Digital-to-Analog Converter (DAC) 118, an Analog-to-Digital Converter (ADC) 140, RF amplifiers 124 and 134, an Inverse Fast Fourier Transform (IFFT) unit 112, and a Fast Fourier Transform (FFT) unit 148, consuming the most power, are almost constant in operation irrespective of the data transfer rate. Consequently, the overall power consumption of the system is large although the data transfer rate become small in the conventional system.

Accordingly, the present invention facilitates high-speed wireless transmission of 1 Gb/s in a local area as well as control of the duration of operation of each part of a circuit based on an amount of transmission data, thereby reducing power consumption of a communication system and a System-on-Chip (SoC). Here, one example of the above-mentioned control is reducing the duration of active traffic mode in an application field having a low data rate such as synchronous connection oriented voice/audio transmission.

Further, the present invention can realize low power consumption even in a high-speed Wireless Personal Area Network (WPAN) having 1 Gb/s payload data transmission performance, and a streaming mode having a low data transfer rate.

Figure 4A:
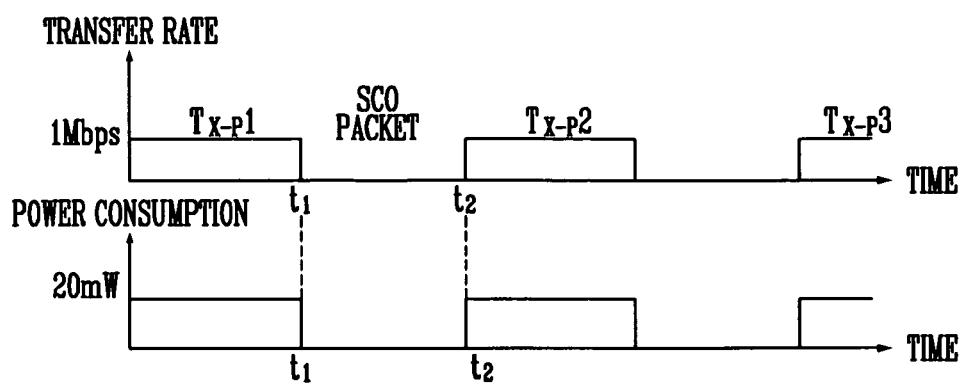
FIG. 4 is a graph of data transfer rate and power consumption versus time in a transceiving system, for explaining the concept of a power saving method in a transceiving system according to the present invention.
Figure 4B:
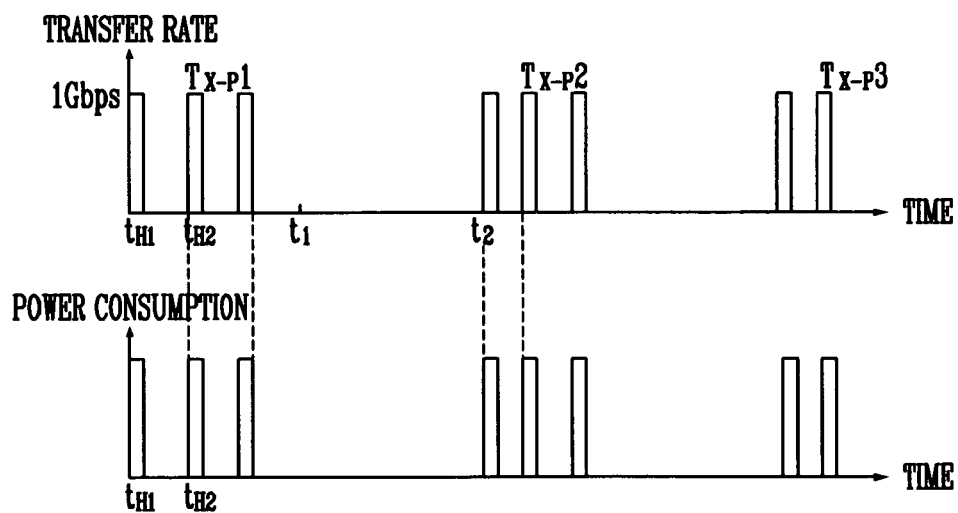

FIGS. 4A and 4B are graphs of data transfer rate and power consumption versus time in a transceiving system, for explaining the concept of a power saving method of the transceiving system according to the present invention.

FIG. 4A illustrates data transfer rate and power consumption versus time, for example, in a Bluetooth chip when data transmission is performed in the conventional transceiver, and FIG. 4B illustrates data transfer rate and power consumption versus time when data transmission is performed in the wideband transceiver according to the present invention.

Referring to FIG. 4A, Bluetooth is a kind of a communication protocol standard that has a maximal data transfer rate of 1 Mb/s, which is very low compared to the communication system such as IEEE 802.11a/b/g WLAN according to the present invention. Bluetooth is designed and adapted to low speed and low power consumption communication such as a voice call. In general, Bluetooth requires a much lower data transfer rate of 64 kb/s or less for a voice call. However, according to Bluetooth, a master communication device and a slave communication device should stay in an active state during a call and should be synchronized with one another, which is called a "Synchronous Connection-Oriented (SCO) link."

As an example, in the conventional art, for a time (t1) during which a first low power slave device (DEV1LP) transmits a SCO packet signal, an entire transmitter part of the first low power slave device (DEV1LP) is maintained in an active state, consuming a power of about 20 mW or less. If such a conventional method is applied to a high-speed wideband OFDM transceiving system, the wideband OFDM transceiving system necessarily consumes hundreds of mW of power or more. Therefore, it is inefficient for the high-speed wideband OFDM transceiving system to be continuously maintained in the active state during packet transmission time (t1) in the synchronous connection oriented mode.

Even a conventional wideband OFDM transmission method for a high speed WPAN (IEEE 802.15.3a) defines a packet for supporting the synchronous connection oriented streaming mode, but has a rather high packet overhead resulting from a preamble since a PLCP preamble, which is comprised of a packet synchronization sequence, a frame synchronization, and a channel estimation sequence, has a length of 5.625 µs.

In general, the time taken for the payload data within one packet is estimated in the following Equation 1:

$$T\_data = T\_sym * R\_data / (N\_DBPS * R\_packet) \quad \text{[Equation 1]}$$

In Equation 1, "T_sym" denotes an interval of one OFDM symbol, "R_data" denotes the data transfer rate which is required, "N_DBPS" denotes the number of data bits per symbol, and "R_packet" denotes the number of packets transmitted per second (packet transfer rate).

In general, if the packet is increased to a predetermined size, a Packet Error Rate (PER) increases and performance is considerably degraded due to retransmission. Therefore, a conventional high-speed WPAN based on OFDM limits a payload size of one packet to a maximum of 4095 bytes. Accordingly, considering the payload size and a coding rate, the packet transfer rate is estimated in the following Equation 2:

$$R\_packet = R\_data / (N\_payload * R\_coding) \quad \text{[Equation 2]}$$

In Equation 2, "N_payload" denotes the number of payload bits within the packet and "R_coding" denotes a FEC coding rate. As an example, when 1 Mb/s streaming data is transmitted in a Quadrature Phase Shift Keying (QPSK) modulated 55 Mb/s mode on the basis of the conventional high-speed WPAN, the active state is maintained and power is consumed during the following time:

$$T\_data = 12.5 \text{ ns/symbol} * 1 \text{ Mb/s} / (17 \text{ bit/Symbol} * 100 \text{ packets/s})$$
$$= 184 \text{ µs/packet}$$

If the packet preamble, the PHY header, the MAC header, the HCS, the tail bits, the FCS, and the pad bits are mixed with one another, the active state should be maintained for about 190 µs per packet. (Refer to IEEE 802.15.3a)

Referring to FIG. 4B, the inventive wideband transceiver transmits data in a 16-QAM modulated 1 Gb/s high-speed communication mode. In this case, if Equation 2 is applied, the active state has to be maintained for only the following very short time (tH1):

$$T\_data = 2.5 \text{ ns/symbol} * 1 \text{ Mb/s} / (300 \text{ bit/symbol} * 100 \text{ packets/s})$$
$$= 10.4 \text{ µs/packet}$$

Therefore, even though the power consumption of 16-QAM OFDM is about two times greater than that of QPSK during the active state due to the increased number of digital signal processing operation, the 16-QAM OFDM can reduce average power consumption 8.8 (184 µs/(10.4 µs*2)) times during the packet transmission time. In other words, the present invention can reduce the duration of the active state, thereby remarkably reducing power consumption.

Figure 5:
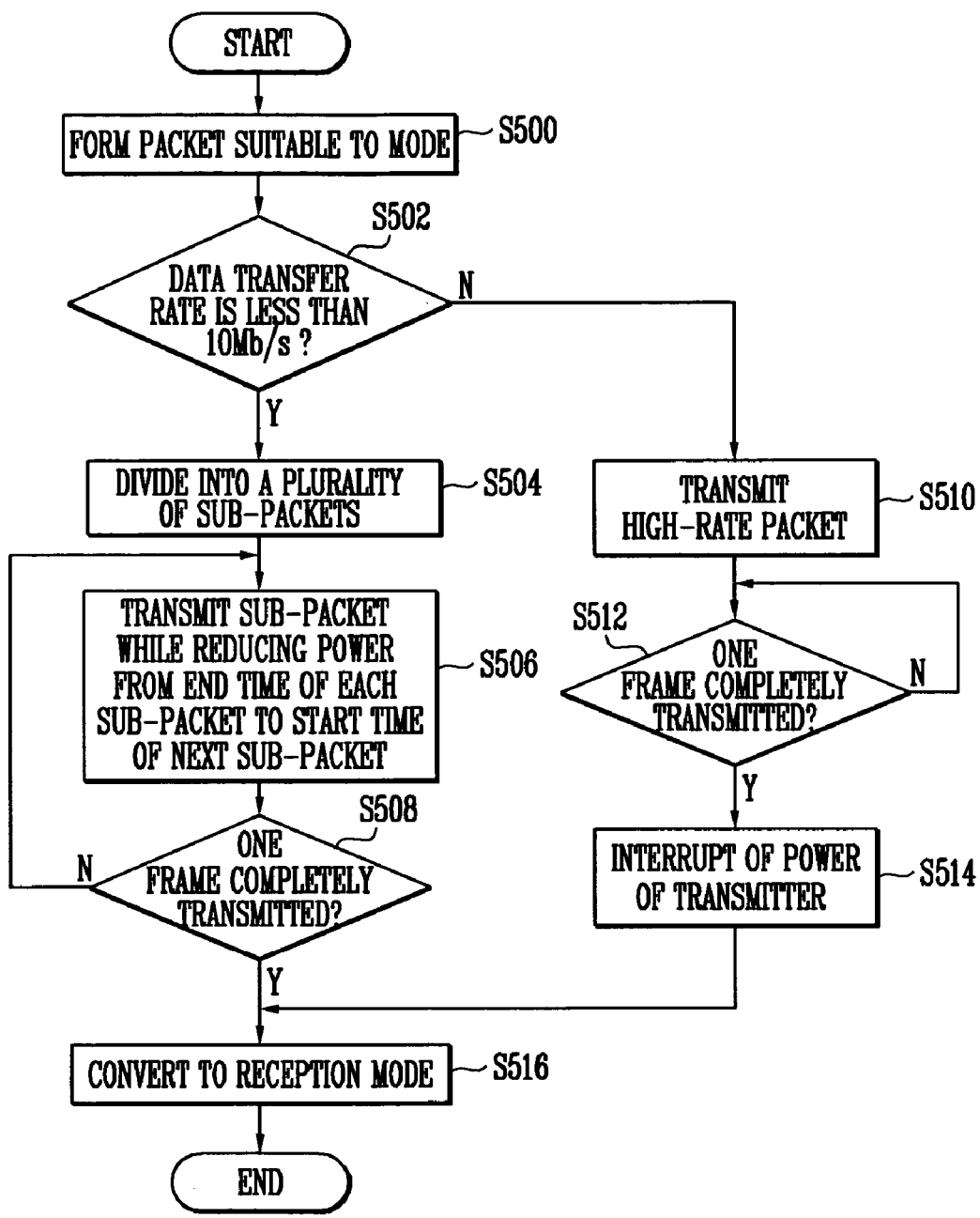
FIG. 5 is a flowchart illustrating a method for transmitting data based on Orthogonal Frequency Division Multiplexing (OFDM) according to an exemplary embodiment of the present invention.

FIG. 5 is a flowchart illustrating a method for transmitting data based on the OFDM according to an embodiment of the present invention.

Referring to FIG. 5, first, initial operation of a device (DEV) including a wideband OFDM transceiving chip and initial connection between a Pico-net Coordinator (PNC) and the device (DEV) are similar to the case of a conventional WPAN and WLAN.

After initial connection, packets suitable for OFDM are formed using streaming data to be transmitted (Step 500). In one embodiment, the packets are formed to be suitable for a 16-QAM OFDM 1 Gb/s mode. Next, it is determined whether or not the required streaming data transfer rate is less than 10 Mb/s (Step 502). If it is determined that the required synchronous connection oriented streaming data transfer rate is less than 10 Mb/s and a transmission distance is short, the payload data portion of the packet is again divided into a plurality of smaller sub-packets so as to reduce the overhead of the preamble and the like (Step 504). In one embodiment, the short transmission distance is less than three meters.

After that, from a transmission end time of each of the divided sub-packets to a transmission start time of a next sub-packet, the power supplied to the baseband modulator and the analog/RF unit is reduced or shut down (Step 506).

Next, it is determined whether or not one frame is completely transmitted (Step 508). If it is determined that the frame is completely transmitted, conversion to a reception mode is performed (Step 516). If it is determined that the frame is not completely transmitted, Step 506 is returned to and sub-packet transmission is repeatedly performed until one frame is completely transmitted.

If it is determined in Step 502 that the required transfer rate of streaming data is more than 10 Mb/s, the OFDM transmitter and the RF transmitter of the physical layer are activated and the packets are transmitted in a conventional manner.

In other words, the non-divided packet of the 16-QAM OFDM 1 Gb/s mode is transmitted (Step 510). It is determined whether or not one frame is completely transmitted (Step 512). If it is determined that one frame is completely transmitted, the power to the transmitter is shut down (Step 514). If it is determined that one frame is not completely transmitted, Step 512 is repeatedly performed until one frame is completely transmitted, and then conversion to the reception mode is performed (Step 516).

By the above operations, the inventive transceiving system has more than 300 bits per OFDM symbol and a high OFDM sampling frequency of more than 500 MHz, thereby facilitating high-speed wireless transmission of 1 Gb/s. Further, the duration of operation state of each part of the circuit can be controlled depending on the amount of transmission data, for one example, the duration of active state can be reduced in an application field having a low data rate such as synchronous connection oriented voice/audio communication, thereby reducing power consumption of the system.

As described above, the present invention facilitates high-speed wireless transmission of 1 Gb/s in a local area as well as control of a duration of active state of each part of a circuit based on an amount of transmission data, thereby reducing power consumption of a communication system and a System-on-Chip (SoC). Here, one example of the above-mentioned control is reducing the duration of operation in an application field having a low data rate such as voice/audio transmission.

Further, the present invention enables low power consumption even in a high-speed WPAN having payload data transmission performance of 1 Gb/s, and in a streaming mode having a low transfer rate.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting data based on OFDM (Orthogonal Frequency Division Multiplexing), the method comprising the steps of:
   forming a plurality of packets suitable for a selected transmission mode from data input to a transmitter;
   determining a transfer rate of the data and required quality of service;
   when a data transfer rate is determined to be low and a synchronous connection oriented link should be maintained, dividing each of the packets into a plurality of divided sub-packets, wherein a power supply duration of the transmitter is reduced from a transmission end time of each of the divided sub-packets to a transmission start time of a next sub-packet; and
   transmitting the divided sub-packets, wherein when the divided sub-packets are transmitted, the power supply duration of the transmitter is reduced.

2. The method according to claim 1, further comprising the step of: when the data transfer rate is determined to be high, transmitting the packets without division.

3. The method according to claim 1, wherein the low data transfer rate is less than 10 Mb/s.

4. The method according to claim 1, wherein the packets are formed to be suitable for a 16-QAM (Quadrature Amplitude Keying) OFDM 1 Gb/s transmission mode.

5. An apparatus for transmitting data based on Orthogonal Frequency Division Multiplexing (OFDM), the apparatus comprising:
   a packet configuration unit for forming a plurality of packets suitable for a selected transmission mode from payload data generated in an upper application layer and a MAC (Media Access Control) layer and storing the plurality of packets therein;
   a packet dividing unit for, when it is determined that a transfer rate of the stored packets is low, dividing each of the plurality of packets into a plurality of sub-packets;
   a modulating unit for OFDM-modulating the payload data of the packets or the sub-packets;
   an analog/RF unit for converting the modulated signal into an analog signal and RF-transmitting the converted analog signal; and
   a fine state controlling unit or dynamic power management (DPM) unit for, when the sub-packets are transmitted, reducing a power supply duration of the modulating unit and the analog/RF unit, wherein the fine slate controlling unit reduces the power supply duration of the modulating unit and the analog/RE unit from a transmission end time of each of the sub-packets to a transmission start time of a next sub-packet.

6. The apparatus according to claim 5, wherein when the packet dividing unit determines the transfer rate to be high, the packets formed in the packet configuration unit are transmitted without division.

7. The apparatus according to claim 5, wherein the packet dividing unit adds a preamble to the sub-packets and generates the sub-packets having a predetermined interval.

* * * * *